United States Patent [19]

Yamamura et al.

[11] 3,806,719

[45] Apr. 23, 1974

[54] CALCULATOR FOR SELECTIVELY CALCULATING IN DECIMAL AND TIME SYSTEMS

[75] Inventors: Katsumi Yamamura; Mitsuhiro Goto, both of Suwa, Japan

[73] Assignee: Kahushiki Kaisha Suwa Seikosha, Tokyo, Japan

[22] Filed: Feb. 22, 1972

[21] Appl. No.: 228,139

[30] Foreign Application Priority Data

Feb. 22, 1971 Japan .................................. 46-8004

[52] U.S. Cl. .................................................. 235/170

[51] Int. Cl. .................................................. G06f 7/50

[58] Field of Search ............................ 235/170, 169

[56] References Cited

UNITED STATES PATENTS

| | | | |
|---|---|---|---|
| 2,890,831 | 6/1959 | Townsend | 235/170 |
| 3,083,910 | 4/1963 | Berkin | 235/170 X |
| 3,089,644 | 5/1963 | Wensley | 235/169 |
| 3,112,396 | 11/1963 | Heywood | 235/170 |
| 3,159,740 | 12/1964 | Broce | 235/169 |
| 3,222,506 | 12/1965 | Meade | 235/169 |
| 3,584,206 | 6/1971 | Evans | 235/170 |

OTHER PUBLICATIONS

R. Townsend, "Serial Digital Adders For a Variable Radix of Notation," Electronic Engineering, October, 1953, pp. 410–416.

*Primary Examiner*—Eugene G. Botz
*Assistant Examiner*—David H. Malzahn
*Attorney, Agent, or Firm*—Waters, Roditi, Schwartz & Nissen

[57] ABSTRACT

A calculating apparatus which comprises circuits for selectively calculating in decimal and hexadic systems, the calculating apparatus further including a switching device to select one of the systems and circuits to supply a carry or borrow correction suitable to the selected system. According to one embodiment of the invention, the last said circuits function to add or subtract a decimal 4 when a correction is to be made for a decimal calculation for a hexadic problem. According to another embodiment, the first said circuits include sequential stages, a shift register coupling said stage, a gate to supply a binary 0110 signal, and a carry/borrow detector coupled to the register and the first of said stages and controlling said gate. According to still another embodiment, the aforesaid circuits collectively comprise a decimal calculator, circuit to supply operands to said calculator to produce a result, a device to examine said result to establish a carry/borrow requirement, flip flops coupled to and actuated by the last said device, gates controlled by the flip flops and by respective timing signals, a further gate controlled in part by the first said gates, a time calculation control switch effecting a complementary control on said further gate, and a correction gate for supplying a binary 0100 signal to said calculator and controlled by said further gate. According to still another embodiment the aforesaid circuits collectively comprise first and second calculator stages, a shift register coupling the stages, first and second correction detectors coupled to said first stage and register to detect decimal and hexedic carry/borrow correction requirements respectively, first and second gates respectively coupled to said first and second detectors and respectively adapted for passing a 0110 decimal correction binary signal and a 1010 hexadic correction binary signal to said second stage, a switch for commanding a time calculation, and an inverter between said gates for selectively and exclusively opening one of said gates to pass a correction signal, the inverter means being controlled by said switch.

2 Claims, 8 Drawing Figures

CALCULATOR FOR SELECTIVELY CALCULATING IN DECIMAL AND TIME SYSTEMS

FIELD OF THE INVENTION

The present invention relates to calculators of the type that calculate time and are adapted for mixed decimal and time figure calculations.

BACKGROUND

When time calculations require a carry or borrow correction from seconds to minutes, or from minutes to hours, a hexadic operation is needed. Thus, if a subtraction is performed between two times, or if a time sum is calculated by adding two times, it is impossible to use an abacus or general-type electronic calculator effectively. If existing calculators are used, it is necessary to convert the data into decimal calculations or the like.

Recently, increasing numbers of articles and facilities have been used with a charge being made for elapsed time. For example, time charges are used for parking-places, skating rinks, swimming pools and so forth. In these cases, the starting and finishing times are recorded and subtraction is effected between these two times, whereby the time of use is calculated. Also salaries and overtime pay are determined by calculating the time elapsing between starting and finishing times and by multiplying the result by a charge for elapsed time.

Thus, as indicated, there are many possible examples of buying and selling time as a medium. In these cases, precise time quantities must be computed by using both decimal and hexadic techniques.

SUMMARY OF THE INVENTION

An object of the present invention is to eliminate the disadvantages of known techniques and to provide an improved calculator wherein a calculation of time and a charge for elapsed time is made readily possible and wherein, further, addition, subtraction, multiplication and division by decimal technique is also possible.

In accordance with this invention, mixed decimal and hexadic calculations can be easily performed.

To achieve the above and other objects of the invention there is provided a calculating apparatus comprising means for selectively calculating in decimal and hexadic systems, means to select one of said systems and means to supply a carry or borrow correction suitable to the selected system.

According to one embodiment of the invention, the last said means functions to add or subtract a decimal four when a correction is to be made for a decimal calculation for a hexadic problem.

According to another embodiment of the invention, the first said means includes sequential stages, a shift register coupling said stages, a gate to supply a binary 0110 signal, and a carry/borrow detector coupled to said register and the first of said stages and controlling said gate.

According to still another embodiment of the invention, the aforesaid means collectively comprise a decimal calculator, means to supply operands to said calculator to produce a result, means to examine said result to establish a carry/borrow requirement, flip flops coupled to and actuated by the last said means, gates controlled by said flip flops and by respective timing signals, a further gate controlled in part by the first said gates, a time calculation control switch effecting a complimentary control on said further gate and a correction gate for supplying a binary 0100 signal to said calculator and controlled by said further gate.

According to still another embodiment of the invention, the aforesaid means collectively comprise first and second calculator stages, a shift register coupling said stages, first and second correction detector means coupled to said first stage and register to detect decimal and hexadic carry/borrow correction requirements respectively, first and second gates respectively coupled to said first and second detector means and respectively adapted for passing a 0110 decimal correction binary signal and a 1010 hexadic correction binary signal to said second stage, a switch for commanding a time calculation and inverter means controlled by such switch and arranged between said gates for selectively and exclusively opening one of said gates to pass a correction signal.

The invention will be more clearly understood from the following detailed description of the aforenoted embodiments of the invention which are illustrated in the accompanying drawing.

DETAILED DESCRIPTION

Figure 1:
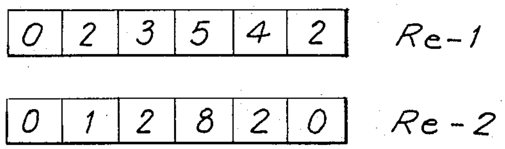
FIGS. 1–4 show entry conditions in two registers of a calculator provided in accordance with one embodiment of the invention.

The following is an example of a time calculation using a decimal calculator for addition and subtraction:

When 2 hrs. 35 mins. 42 secs. and 1 hr. 28 mins. 20 secs. are added and entered into registers as shown in FIG. 1, carry and borrow operations for a hexadic count must be performed in the second and fourth columns (i.e., from seconds to minutes and from minutes to hours).

Figure 2:
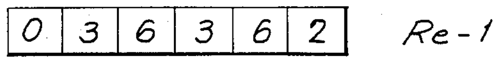

If the above entry is operated upon by using a general-type decimal device for addition and subtraction, the result is as shown in FIG. 2 (i.e., 3 hrs. 63 mins. 62 secs.). However, 63 minutes 62 seconds is not an acceptable result, so 60 seconds must be subtracted from the seconds data, making the seconds columns show 02 and a 1 must be carried into the minutes section. The minutes section then shows 64 due to the adding of the carry from the seconds section. Thus, in the minutes section it is necessary to subtract 60 from 64, making the minutes total 04, and with a carry of 1 to the hour section. The hour column then shows 4 due to the adding of the carry. The result shown in FIG. 2 is then inferior to the result shown in FIG. 3.

Figure 3:
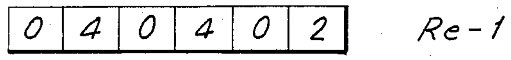
Figure 4:
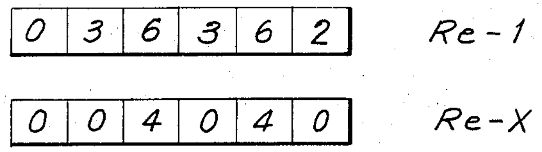

By using the above-mentioned method, it is possible to convert the result shown in FIG. 2 into the result shown in FIG. 3. However, in order to operate easily with a decimal calculator for addition and subtraction, it is necessary to carry and/or borrow for a hexadic operation in the second and fourth columns. Thus, if the result of an addition in one column is more than 5, 4 is added to the result of FIG. 2 obtained by the first calculation. Therefore, in the example of FIG. 2 where both the second and fourth columns must be carried after the first calculation, figures are further added as shown in FIG. 4 and the result is as shown in FIG. 3.

The case of addition which was described above is similar to the case of subtraction. If the 10 secs. column or 10 min. column is involved, it is necessary to subtract 4 from the result obtained by the first calculation in the corresponding column. In order to calculate time by using such method in a time figuring problem, at least two time data are required. To perform a calculation with two time data, when the first time result is calculated, it is necessary to examine for whether a carry or borrow for a hexadic operation is to be performed in the 10 sec. and 10 min. columns and to memorize the results of the examination in a flip-flop circuit. When the next time datum is operated upon, it is required to add or subtract 4 (0100) in the 10 sec. or 10 min. column in which the carry or borrow for the hexadic calculation are to be performed.

Figure 5:
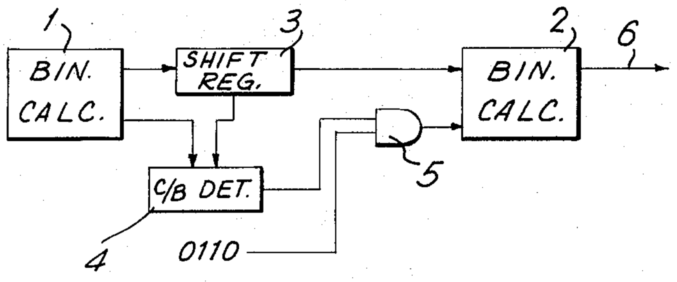
FIG. 5 is a block diagram showing a decimal calculator for full addition and subtraction in accordance with the invention.

A series-type decimal calculator for full addition and subtraction using known integrated circuits can be composed of binary calculators 1 and 2 for full addition and subtraction, a shift register 3 for four bits, a detecting portion 4 for carry and borrow for a decimal calculation, and an AND gate 5, as shown in FIG. 5. If a digit or carry digit of one column is added or subtracted by the first-stage binary calculator 1 for full addition and subtraction and the carry and borrow operations are to occur, the gate 5 is opened by an output signal from the detecting portion 4 for carry or borrow and, in the second-stage binary calculator 2 for full addition and subtraction, 0110 is added to or subtracted from the result obtained by binary calculator 1 and the result is thus changed by 6. To obtain a signal for carry and borrow for hexadic operation in a decimal calculator, it is required to examine the output signal of binary calculator 1 for when it becomes greater than 5 and memorize this fact in a flip-flop circuit.

Thus, in a calculator using decimal devices for full addition and subtraction, it is possible by detecting during calculation a carry or borrow for a hexadic operation to effect mixed decimal and hexadic calculations in accordance with the invention.

Figure 6:
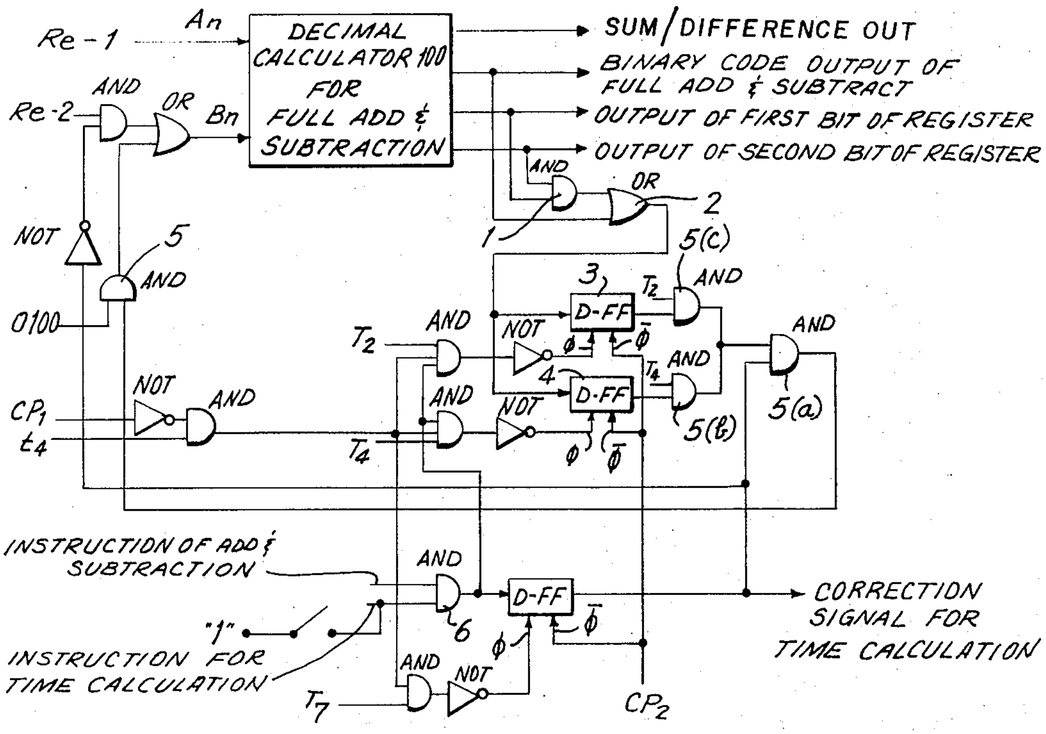
FIG. 6 illustrates a control circuit intended for use when a time figure is to be calculated with the use of a decimal full adder.
Figure 7:
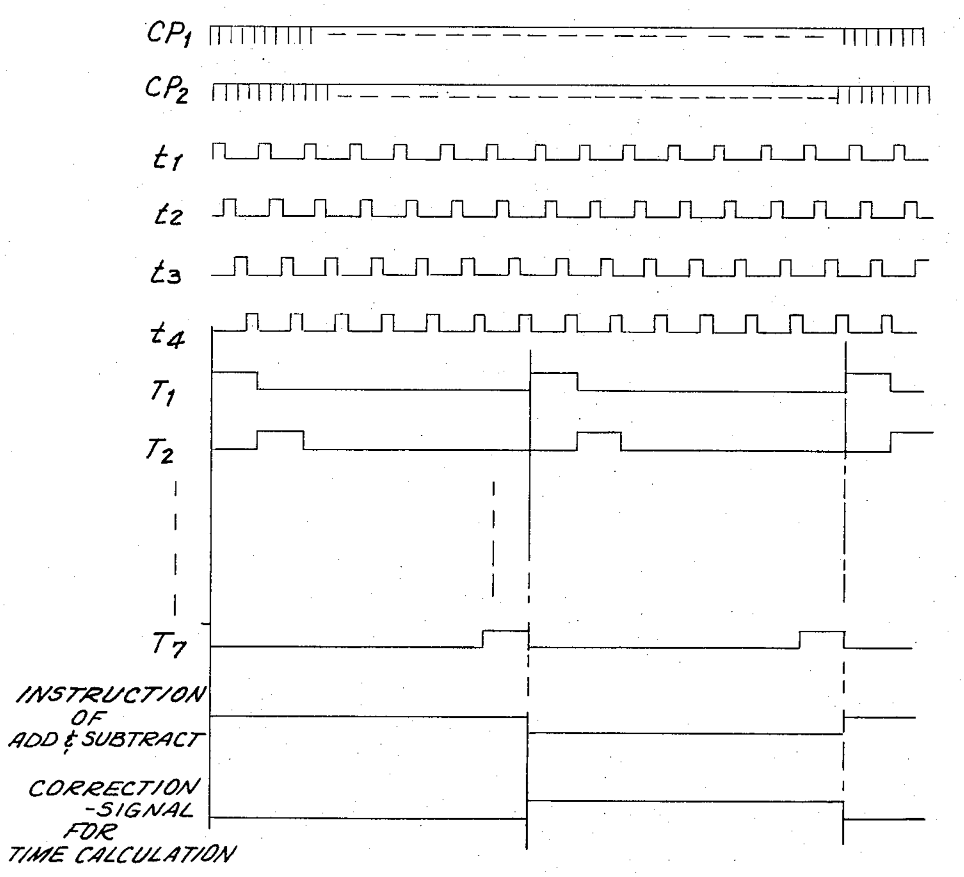
FIG. 7 is a chart illustrating timing pulses for the control of the embodiment of FIG. 6.

FIG. 6 shows a circuit for controlling an operation in a case where the above-mentioned method is applied to a calculator having six columns as shown in FIG. 1. FIG. 7 shows timing pulses relating to this controlling operation.

Signals from the outputs of decimal calculator 100 are detected by AND gate 1 and OR gate 2 which pass signals which are memorized in D-flip flops 3 and 4. The timing of the memory action of D-flip flop 3 is $\overline{T_2 t_4}$ $\overline{cp_1}$. At the timing of clock pulse $cp_2$, the memorized data are produced at the output terminal of this flip flop. The timing of the memory action of D-flip flop 4 is $\overline{T_4 t_4}$ $\overline{cp_1}$. At the time of clock pulse $cp_2$ the memorized data are produced at the output terminal of this flip flop. After the first addition and subtraction, in a time corresponding to one time datum, according to the signals memorized in D-flip flops 3 and 4, the result of the first calculation is supplied into input An. At the time of $T_2$ or $T_4$, AND gate 5 is opened by the action of AND gates 5(*a*), 5(*b*) and 5(*c*), and the result of the first calculation and 0100 are combined.

In the illustrated calculator, AND gate 5 is not opened without a command for time calculation, so that time is not calculated in the absence of the necessary command. As will be seen, decimal calculations and mixed calculations with decimal and hexadic operations can be easily selected by the use of switching means.

The above embodiment involves time calculations in a calculator using decimal calculator for full addition and subtraction. Next, the changes will be described for a calculator whereby decimal calculations and mixed decimal and hexadic calculations can be performed with only one calculation.

As for the decimal calculator mentioned above, the result of addition or subtraction of the binary calculator can be obtained in the first stage, the carry and borrow requirements for decimal count being therein detected, and the operation of ±0110 can be effected in the second stage. Similarly, for hexadic calculations, the carry and borrow requirements for hexadic count are detected when the product is more than 5, and are compensated by ± 1010. From the above, a calculator as shown in FIG. 8 is designed so that decimal calculations and mixed decimal and hexadic calculations for time quantitites can be performed.

Figure 8:
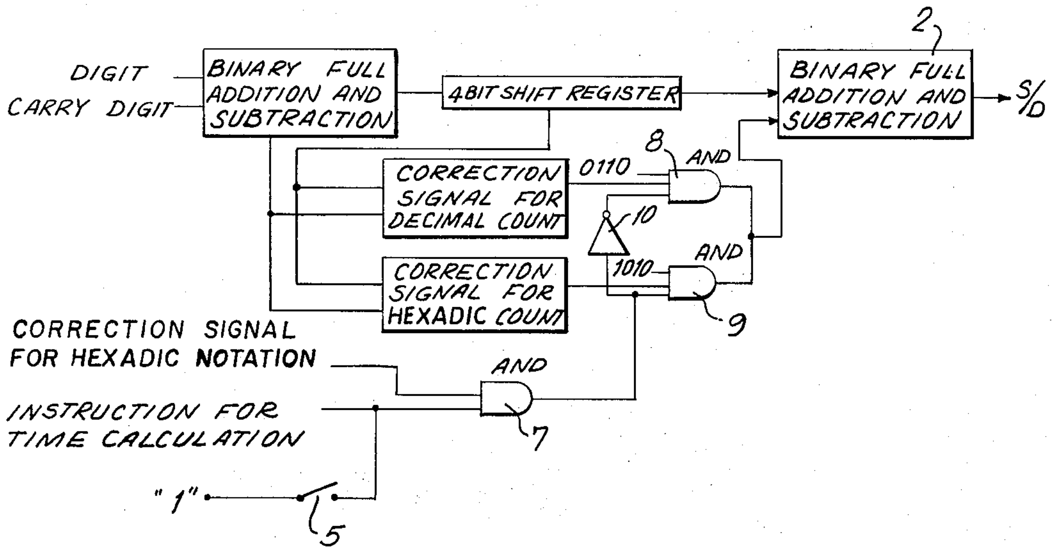
FIG. 8 is a block diagram of a calculation device wherein may be performed decimal or mixed decimal and hexadic calculations.

In the case of the decimal calculator shown in FIG. 8 for addition and subtraction, as AND gate 7 is closed, its output is zero and AND gate 9 is closed; that is, addition and subtraction of 0110 are only effected based on a decimal command. However, when a time calculation is commanded by the switching means S, AND gate 7 is opened. As for the other input to AND gate 7, this is the timing for a hexadic operation. Ao shown above relative to FIG. 1, when an entry is made in the seconds column in the lowest rank of the register, after the calculation begins, the result in the 10 sec. column is entered into the binary calculator first stage at timing $T_2$. The output of said binary calculator is complemented by the binary calculator for full addition and subtraction in the second stage at time $T_3$. Similarly, as for the 10 min. column, the complement for the hexadic operation is provided at time $T_5$. Therefore, the hexadic complement is provided at time $T_3 + T_5$. At this time, the output of AND gate 7 becomes "1" and opens AND gate 9 and the signal that passes through inverter 10 becomes a signal that closes AND gate 8.

If, at the time of $T_2$ and $T_4$, the carry and borrow for a hexadic calculation are detected, the complementary hexadic command is supplied into AND gate 9 at the time of $T_3$ and $T_5$. 1010 is the input into the second stage 2 and the hexadic operation is performed. In a period of the timing except at $T_3$ and $T_5$, AND gate 9 is closed AND gate 8 is opened, and when the corrections for decimal notation is generated, 0110 is the input into the binary calculator stage 2 and the decimal correction is performed. Thus, in the calculator for full addition and subtraction according to this embodiment of the invention, time calculations and decimal calculations, decimal calculations or mixed decimal and hexadic calculations for time are possible with only one calculation.

As mentioned above, in the calculator of this invention, time can be easily calculated, so it is not necessary to convert time into a decimal figure. This calculation is very effective for the calculation of wages or time charges.

In facilities in which the charge for elapsed time is predetermined and the charge is calculated by multiplying the time used or time required by the charge for elapsed time, a business calculation such as total users or total amount sold is often required such as in general companies or shops. However, according to this invention, the general decimal calculation can be also performed by the use of a switch so that calculation can be performed very easily. Moreover, in accordance with this invention, to improve the calculation of charges for elapsed time, means for printing the starting time of utilization, a receipt making means which copies the calculated charge for elasped time, and a cash register may be provided independently of or cooperatively with a time clock. If a time indicating device such as a watch is provided and by a signal supplied from this device the starting time of utilization is made on entry as a key function, subtraction is immediately performed between said signal and a present-time signal shown in the display device, and the time used or the time required is easily calculated. Therefore, many other applications may be effected within the scope of the invention.

What is claimed is:

1. Time calculating apparatus comprising a decimal calculator, means to supply operands to said calculator to produce a result, means to examine said result to establish a carry/borrow requirement, flip flops coupled to and actuated by the last said means, gates controlled by said flip flops and by respective timing signals, a further gate controlled in part by the first said gates, a time calculation control switch effecting a complementary control on said further gate, gate means and a flip flop connected in series between said switch and further gate, and a correction gate for supplying a binary 0100 signal to said calculator and controlled by said further gate.

2. Calculating apparatus for selectively calculating in decimal and time figure systems, comprising calculation means having two stages, a selection switch to select decimal or time figure calculation a shift register coupled between said stages, first and second correction detector means coupled to one of said stages and register to detect decimal and hexadic carry/borrow correction requirements respectively, first and second gates respectively coupled to said first and second detector means and respectively adapted for passing a 0110 decimal correction binary signal and a 1010 hexadic correction binary signal to the other of said stages, said second gate being responsive to and controlled by said selection switch, and an inverter circuit responsive to said selection switch and coupled to and controlling said first gate.

* * * * *